(12) United States Patent
Acharya et al.

(10) Patent No.: US 7,050,640 B1
(45) Date of Patent: May 23, 2006

(54) WAVELET ZEROTREE IMAGE CODING OF ORDERED BITS

(75) Inventors: Tinku Acharya, Chandler, AZ (US);
Prabir K. Biswas, Kharagpur (IN);
Niloy J. Mitra, Calcutta (IN)

(73) Assignees: Intel Corporation, Santa Clara, CA (US); Indian Institute of Technology, Kharagpur (IN)

( * ) Notice: Subject to any disclaimer, the term of this patent is extended or adjusted under 35 U.S.C. 154(b) by 647 days.

(21) Appl. No.: 09/723,123

(22) Filed: Nov. 27, 2000

Related U.S. Application Data

(63) Continuation-in-part of application No. 09/390,255, filed on Sep. 3, 1999.

(51) Int. Cl.
*G06K 9/36* (2006.01)

(52) U.S. Cl. .................. 382/240; 382/236; 382/248

(58) Field of Classification Search ............... 382/236, 382/238, 240, 248; 375/240.11, 240.19
See application file for complete search history.

(56) References Cited

U.S. PATENT DOCUMENTS

| | | | |
|---|---|---|---|
| 5,321,776 A | 6/1994 | Shapiro | 382/56 |
| 5,563,960 A | 10/1996 | Shapiro | 382/239 |
| 5,748,786 A | 5/1998 | Zandi et al. | 382/240 |
| 5,777,678 A * | 7/1998 | Ogata et al. | 375/240.11 |
| 6,125,201 A * | 9/2000 | Zador | 382/166 |
| 6,144,773 A | 11/2000 | Kolarov et al. | 382/240 |
| 6,157,746 A * | 12/2000 | Sodagar et al. | 382/240 |
| 6,222,941 B1 * | 4/2001 | Zandi et al. | 382/232 |
| 6,269,192 B1 * | 7/2001 | Sodagar et al. | 382/240 |
| 6,359,928 B1 | 3/2002 | Wang et al. | 375/240.06 |
| 6,393,060 B1 * | 5/2002 | Jeong | 375/240.19 |
| 2002/0048405 A1 * | 4/2002 | Zandi et al. | 382/232 |

FOREIGN PATENT DOCUMENTS

| | | |
|---|---|---|
| EP | 0 892 557 A1 | 1/1999 |
| EP | 0 905 978 A2 | 3/1999 |
| EP | 0 920 213 A2 | 6/1999 |
| EP | 0 926 896 A2 | 6/1999 |
| WO | PCT/US02/16357 | 5/2002 |

\* cited by examiner

*Primary Examiner*—Yon J. Couso
(74) *Attorney, Agent, or Firm*—Trop, Pruner & Hu, P.C.

(57) ABSTRACT

A computer system includes a memory and a processor. The memory stores a program to cause the processor to provide error data that indicate motion in an image. The processor represent each error signal as a collection of ordered bits, and the processor codes the bits of each order to indicate zerotree roots that are associated with the order.

15 Claims, 9 Drawing Sheets

$$D(1) \longrightarrow \{ G_1(1), G_2(1), G_3(1), G_4(1) \}$$

WAVELET ZEROTREE IMAGE CODING OF ORDERED BITS

CROSS-REFERENCE TO RELATED APPLICATION

This is a continuation-in-part of patent application Ser. No. 09/390,255 filed on Sep. 3, 1999.

BACKGROUND

The invention generally relates to encoding of wavelet data, such as zerotree encoding of wavelet transformed error data, for example.

Data compression typically removes redundant information from a set of data to produce another set of data having a smaller size. This smaller size may be beneficial, for example, for purposes of transmitting the data over a bus or network.

For example, the pixel intensities of an image may be indicated by a set of coefficients, and these coefficients may be represented by digital image data. For purposes of compressing the image data, the data may be transformed to reveal redundant information, i.e., redundant information may be removed via data compression. For example, the image data may be transformed pursuant to a wavelet transformation, a transformation that effectively decomposes the image into spatially filtered images called frequency subbands. In this manner, the subbands may reveal a significant amount of redundant information that may be removed by compression techniques.

Referring to FIG. 1, as an example, image data that indicates pixel intensities of an image 12 may undergo wavelet transformations to decompose the image 12 into subbands. Due to the nature of the transformations, the subbands appear in different decomposition levels (levels 14, 16 and 18, as examples). In this manner, to decompose the original image 12 into subbands 14a, 14b, 14c and 14d of the first decomposition level 14, the one dimensional Discrete Wavelet Transform (DWT) is applied row-wise and then column-wise. In one dimensional DWT, the signal (say a row-wise) is first low-pass filtered and sub-sampled by dropping the alternate filtered output to produce the low-frequency subband (L) which is half the size of the original signal. Then the same signal is high-pass filtered and similarly sub-sampled to produce the high-frequency subband (H) which is half the size of the original signal. When the same one dimensional operation is applied column-wise on the L subband, it produces two subbands LL and LH. Similarly, applying the same one dimensional operation column-wise on the H subband, it produces two subbands HL and HH subbands.

As a result after two-dimensional Discrete Wavelet Transform, the original image 12 is decomposed into four subbands: the LL subband 14a, the LH subband 14b, HL subband 14c and HH subband 14d. Sizes of the row and column of each of these subbands is half the sizes of the row and column of the original images due to the sub-sampling operation. The values of these subbands are called the wavelet coefficients and hence the subbands may be represented by an associated matrix of wavelet coefficients.

The LL subband 14a indicates low frequency information in both the horizontal and vertical directions of the image 12 and typically represents a considerable amount of information present in the image 12 because it is nothing but the sub-sampled version of the original image 12. The LH subband 14b indicates low frequency information in the horizontal direction and high frequency information in the vertical direction, i.e., horizontal edge information. The HL subband 14c indicates high frequency information in the horizontal direction and low frequency information in the vertical direction, i.e., vertical edge information. The HH subband 14b indicates high frequency information in the horizontal direction and high frequency information in the vertical direction, i.e., diagonal edge information.

Since LL subband 14a is nothing but the sub-sampled version of the original image, it maintains the spatial characteristics of the original image. As a result, the same DWT decomposition can be further applied to produce four subbands that have half the resolution of the LL subband 14a in both the vertical and horizontal directions: the LL subband 16a, LH subband 16b, HL subband 16c and HH subband 16d. Hence the LL subband 16a is again the sub-sampled version of the LL subband 14a. Hence LL subband 16a can be further decomposed to four subbands that have half of its resolution in both horizontal and vertical directions: LL subband 18a, LH subband 18b, HL subband 18c and HH subband 18d.

The subbands of the lower decomposition levels indicate the information that is present in the original image 12 in finer detail (i.e., the subbands indicate a higher resolution version of the image 12) than the corresponding subbands of the higher decomposition levels. For example, the HH subband 18d (the parent of the HH subband 16d) indicates the information that is present in the original image 12 in coarser detail than the HH subband 16d (the child of the HH subband 18d), and the HH subband image 14d (another descendant of the HH subband 18d) indicates the information that is present in the original image 12 in finer detail than the HH 16d and 18d subbands. In this manner, a pixel location 24 of the HH subband image 18d corresponds to four pixel locations 22 of the HH subband 16d and sixteen pixel locations 20 of the HH subband 14d.

Due to the relationship of the pixel locations between the parent subband and its descendants, a technique called zerotree coding may be used to identify wavelet coefficients called zerotree roots. In general, a zerotree root is a wavelet coefficient that satisfies two properties: the coefficient has an insignificant intensity, and all of the descendants of the coefficient have insignificant intensities with respect to a certain threshold. Thus, due to this relationship, a chain of insignificant coefficients may be indicated by a single code, a technique that compresses the size of the data that indicates the original image. As an example, if the wavelet coefficient for the location 24 is a zerotree root, then the wavelet coefficients for the locations 20, 22 and 24 are insignificant and may be denoted by a single code.

The coding of each decomposition level typically includes two passes: a dominant pass to determine a dominant list of wavelet coefficients that have not been evaluated for significance and a subordinate pass to determine a subordinate list of wavelet coefficients that have been determined to be significant. During the subordinate pass, a threshold may be calculated for each subband and used to evaluate whether coefficients of the subband are insignificant or significant. Unfortunately, due to the computational complexity, the above-described compression technique may be too slow for some applications, such as an interactive video compression application, for example.

Thus, there is a continuing need for an arrangement that addresses one or more of the above-stated problems.

DETAILED DESCRIPTION

Figure 1:
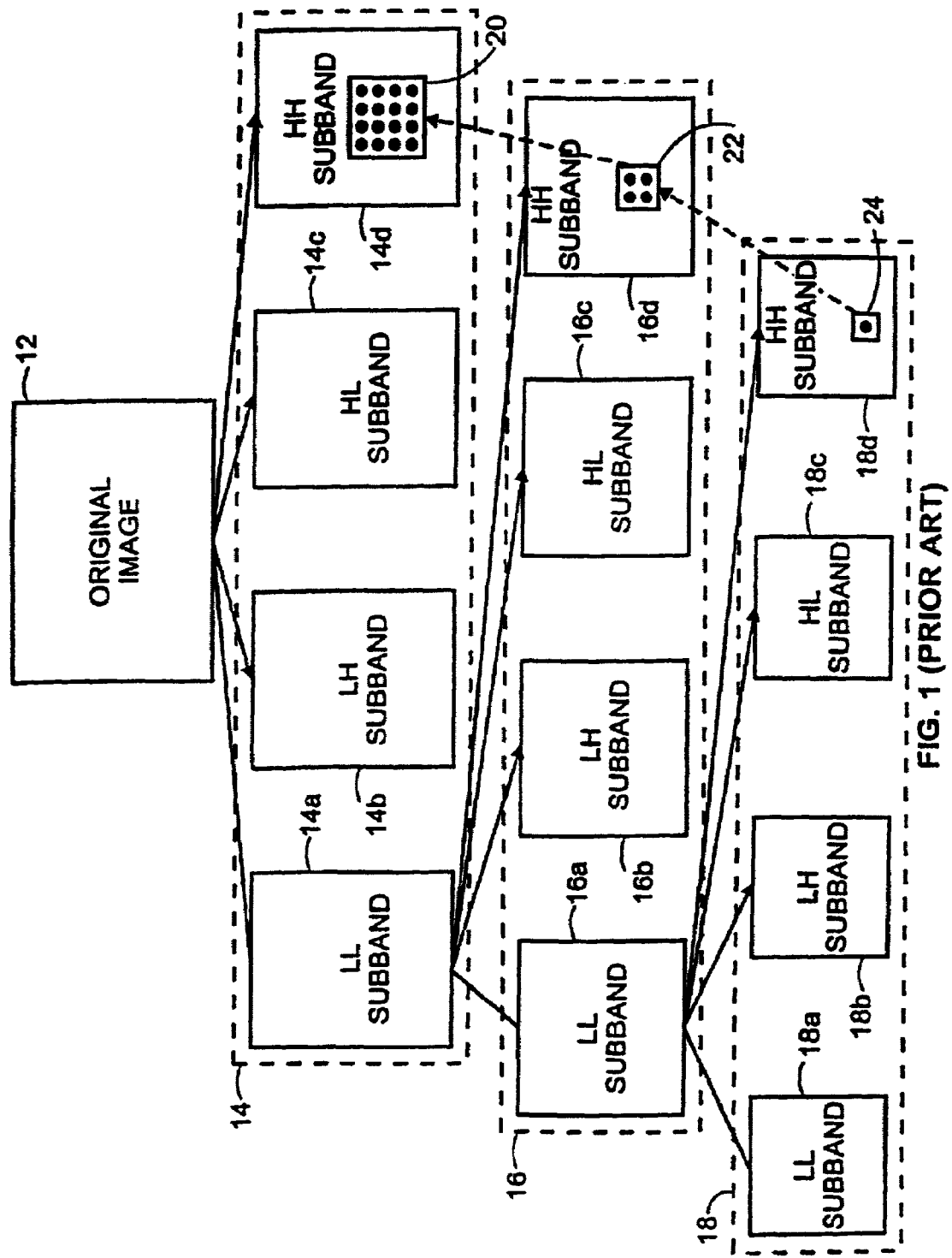
FIG. 1 is an illustration of the hierarchical order of subbands produced by wavelet transformations.
Figure 2:
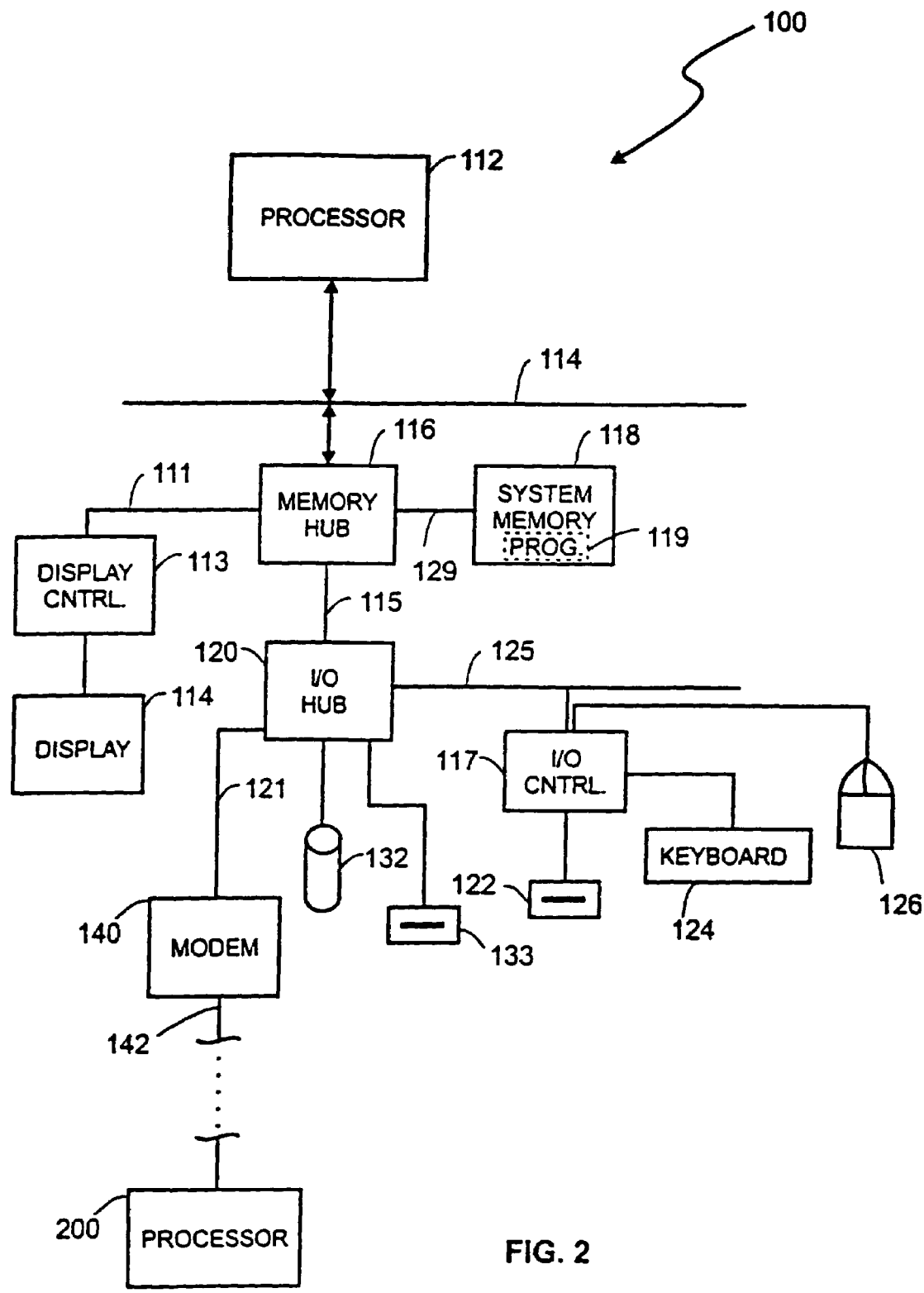
FIG. 2 is a schematic diagram of a computer system according to an embodiment of the invention.

Referring to FIG. 2, an embodiment 119 of a compression program, in accordance with one embodiment of the invention, may enable a processor 112 to encode wavelet coefficients in a bit-wise fashion in a technique which may be called modified embedded zerotree (MEZT) coding. In this manner, instead of classifying the wavelet coefficients (as zerotree roots or isolated zeros, as examples), the processor 112 may produce codes to classify the bits of the wavelet coefficients. For example, in some embodiments, the processor 112 may classify a particular bit as being either a zerotree root, an isolated zero, a positive node or a negative node. Unlike conventional zerotree coding schemes, thresholds are not computed to identify insignificant values, as the "0" bit is treated as being insignificant and the "−1" and "1" bits are treated as being significant.

In this manner, the processor 112 may generate one of the following codes to classify a particular bit: a "P" code to indicate a positive node if the bit indicates a "1"; an "N" code to indicate a negative node if the bit indicates a "−1"; an "R" code to indicate that a "0" bit is a zerotree root; and an "IZ" code to indicate that a "0" bit is an isolated zero. In some embodiments, a particular bit is classified as a negative node only if the bit is the most significant nonzero bit and the bit indicates a "−1." For example, for a coefficient of "−3" that is represented by the three bits "−011," the processor 112 generates an N code to represent the middle bit. However, for this example, the processor 112 generates a P code to represent the least significant bit.

For purposes of providing the wavelet coefficients, the processor 112 may, via wavelet transformations, decompose coefficients that represent pixel intensities of an original image. These wavelet coefficients, in turn, form subbands that are located in multiple decomposition levels. To classify the bits, the processor 112, in some embodiments, may execute the program 119 to process the bits based on their associated bit position, or order. In this manner, the bits of each bit order form a hierarchical tree that the processor 112 may traverse to classify each of the bits of the tree as being either a zerotree root, an isolated zero, a negative node or a positive node. Thus, as an example, the most significant bits of the wavelet coefficients (this bit may also be zero) are associated with one hierarchical tree (and one bit order), and the next most significant bits are associated with another hierarchical tree (and another bit order).

For example, if the absolute maximum wavelet coefficient is represented by three bits (as an example), then all of the wavelet coefficients may be represented by three bits. Therefore, for this example, three hierarchical trees are formed. In this manner, the processor 112 produces a code for each bit based on its indicated value (i.e., "−1," "0," or "1") and possibly (if the bit indicates a "0") its position in the associated hierarchical tree.

In some embodiments, the processor 112 indicates the P, N, IZ and R codes via a bit stream that progressively indicates a more refined (i.e., a higher resolution) version of the original image over time. For example, the processor 112 may use the bits "00" to indicate the "P" code, the bits "01" to indicate the "N" code, the bits "10" to indicate the "R" code and the bits "11" to indicate the IZ code. Other coding schemes are possible. The progressive nature of the bit stream is attributable to the order in which the processor 112 processes the bit orders. For example, in some embodiments, the processor 112 may process the bit orders in a most significant first fashion. Therefore, the processor 112 may initially produce code for all the bits that have the highest bit order, then produce code for all of the bits that have the next highest bit order, etc. As a result of this progressing coding, the resultant bit stream may initially indicate a coarser version of the original image. However, more refinements to the image are indicated by the bit stream over time, as the processor 112 produces the codes for the bits having the lower bit orders. Thus, in some embodiments, the resolution of the image that is indicated by the bit stream improves over time, a feature that may be desirable for bandwidth-limited systems. As a result, a decrease in resolution of the reconstructed image may be traded for a decrease in communication bandwidth.

Figure 3:
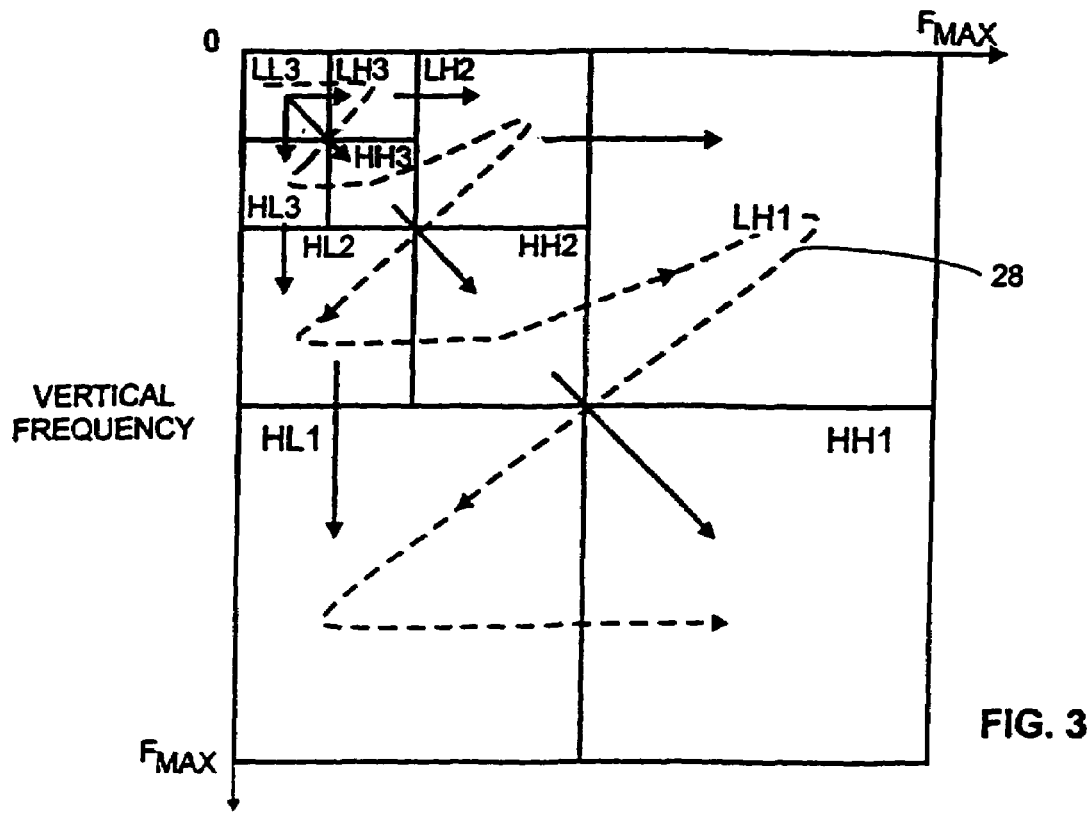
FIG. 3 is an illustration of a scanning path to determine zerotree roots according to an embodiment of the invention.

Referring to FIG. 3, in some embodiments, the processor 112 process the bits of each order in a predefined sequence. For example, for a particular bit order, the processor 112 may begin with the highest decomposition level and produce codes for the bits of the highest decomposition level before proceeding to produce codes for the bits of the next highest decomposition level. The processor 112 produces code(s) for the bit(s) of the LL subband and, then for each decomposition level, produces code(s) for the bit(s) of the LH subband, subsequently, produces code(s) for the bit(s) of the HL subband and lastly, produces code(s) the bit(s) of the HH subband.

Figure 4:
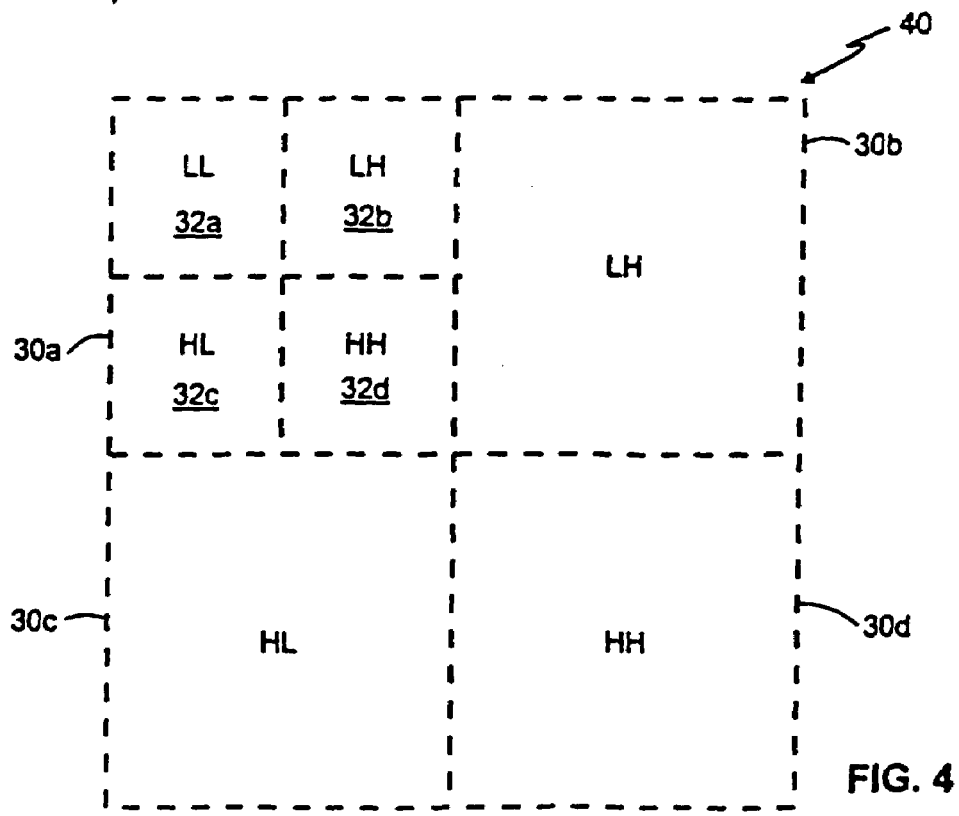
FIG. 4 is an illustration of the organization of a wavelet coefficient matrix according to an embodiment of the invention.

As an example, the wavelet coefficients produced by a two level decomposition may be arranged in a matrix 40 that is depicted in FIG. 4. In this manner, the matrix 40 may be viewed as being subdivided into four quadrants 30a, 30b, 30c and 30d. The upper right 30b, lower left 30c and lower right 30d quadrants includes the coefficients for the LH, HL and HH subband images, respectively, of the first decomposition level. The coefficients for the LL, LH, HL and HH subband images of the second decomposition level are located in the upper left 32a, upper right 32b, lower left 32c and lower right 32*d* quadrants of the upper left quadrant 30*a*. The coefficients produced by further decomposition may be arranged in a similar manner. For example, for a third level of decomposition, the upper left quadrant 32*a* includes the wavelet coefficients of the LL, LH, HL and HH subbands of the third decomposition level.

Figures 5, 6:
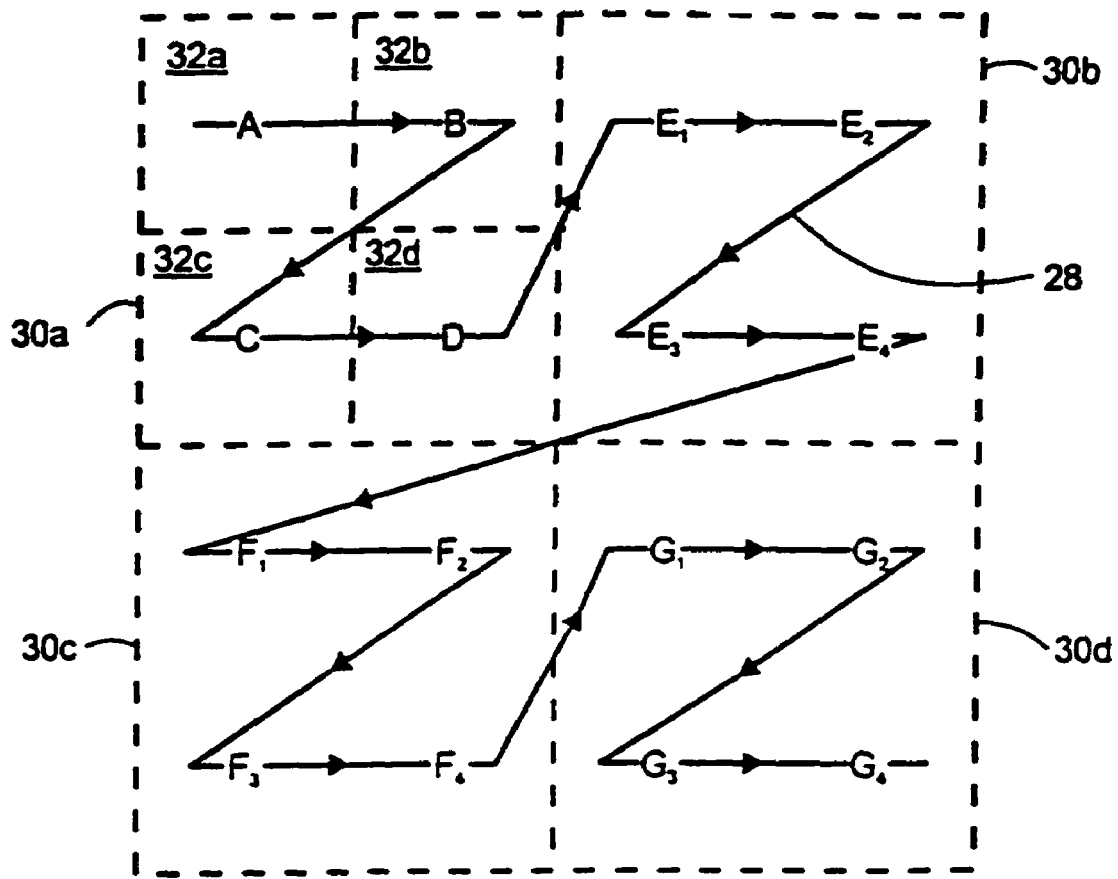
FIG. 5 is an illustration of a scanning path for a wavelet coefficient matrix.
FIG. 6 is an illustration of a path that is traversed to locate zerotree roots.

If the coefficient matrix that indicates the pixel intensities for the original image is a 4×4 matrix, then the matrix 40 may be of the form that is depicted in FIG. 5. In this manner, the LL, LH, HL and HH subband images of the second decomposition level each have one coefficient, represented by "A" (for the LL subband image), "B" (for the LH subband image), "C" (for the HL subband image) and "D" (for the HH subband image), respectively. As depicted in FIG. 5, for the first decomposition level, the coefficients for the LH, HL and HH subband images are represented by the following respective matrices:

$$\begin{bmatrix} E_1 & E_2 \\ E_3 & E_4 \end{bmatrix}, \begin{bmatrix} F_1 & F_2 \\ F_3 & F_4 \end{bmatrix}, \begin{bmatrix} G_1 & G_2 \\ G_3 & G_4 \end{bmatrix}$$

It is noted that each coefficient of the second decomposition level (except A), is associated with at least four coefficients of the first decomposition level, i.e., each coefficient of the first decomposition level has at least four descendant coefficients in the second decomposition level. Therefore, each bit in the first decomposition level has at least four descendent coefficients in the second decomposition level.

For each bit order, the processor 112 may process the bits in the scanning sequence described above. If a particular bit indicates a "1" or a "−1," then the processor 112 generates the P or N code and proceeds to process the next bit in the scanning sequence. However, if a particular bit indicates a "0," then the processor 112 may trace the bit through its descendants to determine if the bit is an isolated zero or a zerotree root. The coefficients in the LL subband are simply entropy encoded.

As an example, to produce the code for the least significant bit (called D(1)) of the D coefficient (located in the HH subband of the second decomposition level), the processor 112 determines whether the D(1) bit indicates a "0." If so, the processor 112 evaluates the descendant bits G1(1), G2(1), G3(1) and G4(1) of the subband HH of the first decomposition level in search of a "1" or "−1," as indicated in FIG. 6. If one of these bits indicates a "1" or "−1," then the D(1) bit is an isolated zero. Otherwise the D(1) bit is a zerotree root.

As a numeric example, a 4×4 coefficient matrix that indicates pixel intensities for an image may undergo a two level decomposition to form the following matrix:

$$\begin{bmatrix} 4 & 1 & 1 & 2 \\ -2 & 0 & 0 & 1 \\ 0 & 3 & 0 & 0 \\ 0 & 1 & 0 & 0 \end{bmatrix}$$

Because the maximum absolute value is "4," three bits may be used to represent the coefficients, as depicted in the following matrix:

$$\begin{bmatrix} 100 & 001 & 001 & 010 \\ -010 & 000 & 000 & 001 \\ 000 & 011 & 000 & 000 \\ 000 & 001 & 000 & 000 \end{bmatrix}$$

Therefore, the processor 112 begins the encoding by generating codes for the third order bits (i.e., the most significant bits, which may be zero also) of the coefficients. More particularly, to generate the codes for the third order bits, the processor 112 follows the path 28 (see FIG. 5) and produces the appropriate code for the third bit of each coefficient along the path 28. If a particular bit indicates a "0," then the processor 112 evaluates the descendents of the bit to find isolated zeros and zero roots. The coding of the third order bits by the processor 112 produces the following codes (listed in the order of production): P,R,R,R. Subsequently, the processor 112 produces the codes for the second order bits (listed in order of production): IZ,IZ,N,R,IZ,P,IZ,IZ,IZ, P,IZ,IZ. Lastly, the processor 112 produces the codes for the first order bits (listed in order of production): IZ,P,IZ,R,P, IZ,IZ,P,IZ,P,IZ,P. As described above, the processor 112 may indicate the codes via a two bit coding scheme and transmit the codes as produced via a bit stream.

As an example, another processor 200 (see FIG. 2) may use the bit stream to reconstruct the coefficient matrix that indicates the pixel in intensities of the original image in the following manner. Before the decoding begins, the processor 200 first receives an indication from the processor 112 that three levels of coding (i.e., one level for each bit order) have been used. After obtaining this information, the processor 200 may reconstruct the original coefficient matrix using the codes in the order that the codes are produced. More particularly, the processor 200 may use the codes produced by the coding of the bits of the third bit order (i.e., the first level of coding) to produce the following matrix:

$$\begin{bmatrix} 100 & 000 & 000 & 000 \\ 000 & 000 & 000 & 000 \\ 000 & 000 & 000 & 000 \\ 000 & 000 & 000 & 000 \end{bmatrix}$$

The processor 200 may use this matrix to reconstruct a coarse version (i.e., a lower resolution version) of the original image. However, if a more refined version is desired, the processor 200 may use the codes that are produced by the coding of the second bit order (i.e., the second level of coding) to produce the following matrix:

$$\begin{bmatrix} 100 & 000 & 000 & 000 \\ -010 & 000 & 000 & 000 \\ 000 & 010 & 000 & 000 \\ 000 & 000 & 000 & 000 \end{bmatrix}$$

Finally, if the processor 200 uses the codes that are produced by the coding of the bits of the first order (i.e., the third level of coding), the processor 200 produces the original matrix of decomposed wavelet coefficients.

Figure 7:
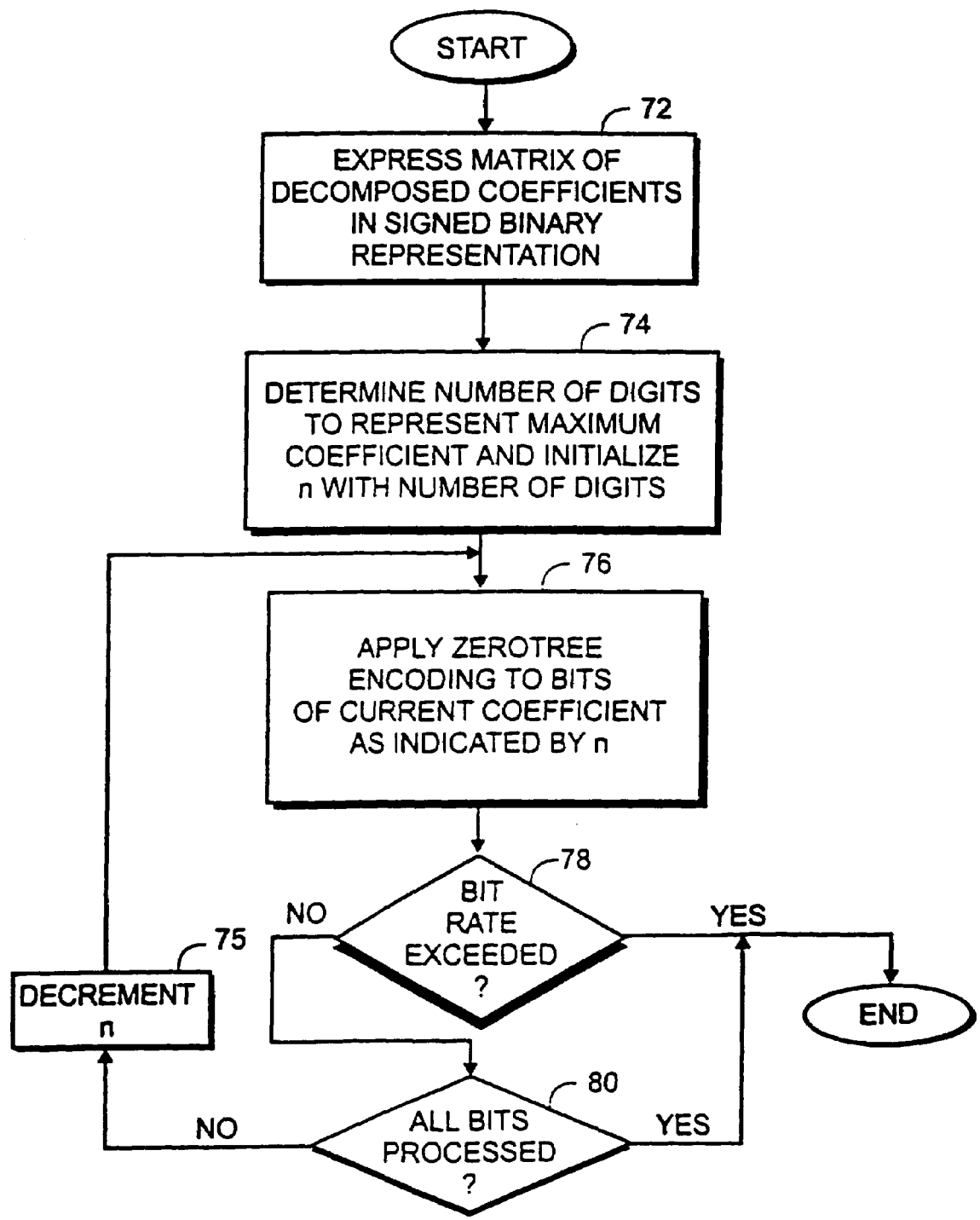
FIG. 7 is a flow chart illustrating the execution of a program to encode wavelet coefficients according to an embodiment of the invention.

Referring to FIG. 7, to summarize, the compression program 119, when executed by the processor 112 may cause the processor 112 to perform the following procedure to produce the above-described coding. First, the processor 112 may express (block 72) a matrix of decomposed coefficients in a signed binary representation. Next, the processor 112 may determine (block 74) the number of digits that are needed to represent the absolute value of the maximum wavelet coefficient. This processor 112 uses a variable (called n) that indicates the current bit order being processed by the processor 112. In this manner, the processor 112 uses a software loop to process the bits, one bit order at a time. To accomplish this, the processor 112 produces codes (block 76) for the bits of the current bit order the using the techniques described above. Subsequently, the processor 112 determines (diamond 78) whether the rate of transmitted bits may exceed a predetermined bit rate. If so, the processor 112 terminates the coding for the current image to comply with the predetermined bit rate. Otherwise, the processor 112 determines (diamond 80) if all bit orders have been processed, i.e., the processor 112 determines if n equals "1." If not, the processor 112 decrements (block 75) the order that is indicated by the n variable by one and proceeds to block 76 to traverse the loop another time to produce codes for the bits of another bit order. Otherwise, the coding is complete.

Referring back to FIG. 2, in some embodiments, the processor 112 may be part of a computer system 100. The computer system 100 may include a bridge, or memory hub 116, and the processor 112 and the memory hub 116 may be coupled to a host bus 114. The memory hub 116 may provide interfaces to couple the host bus 114, a memory bus 129 and an Accelerated Graphics Port (AGP) bus 111 together. The AGP is described in detail in the Accelerated Graphics Port Interface Specification, Revision 1.0, published on Jul. 31, 1996, by Intel Corporation of Santa Clara, Calif. A system memory 118 may be coupled to the memory bus 129 and store the compression program 119. As described above, the compression program 119, when executed by the processor 112, may cause the processor 112 to provide wavelet coefficients that indicate an image and represent each wavelet coefficient as a collection of ordered bits. The processor 112 codes the bits of each order to indicate zerotree roots that are associated with the order.

Among other features of the computer system 100, a display controller 113 (that controls the display 114) may be coupled to the AGP bus 11. A hub communication link 115 may couple the memory hub 116 to another bridge circuit, or input/output (I/O) hub 120. In some embodiments, the I/O hub 120 includes interfaces to an I/O expansion bus 125 and a Peripheral Component Interconnect (PCI) bus 121. The PCI Specification is available from The PCI Special Interest Group, Portland, Oreg. 97214.

A modem 140 may be coupled to the PCI bus 121 to a telephone line 142. In this manner, the modem 140 may provide an interface that permits the bit stream that is produced by the processor 112 to be communicated to the processor 200. The I/O hub 120 may also include interfaces to a hard disk drive 132 and a CD-ROM drive 133, as examples. An I/O controller 117 may be coupled to the I/O expansion bus 125 and receive input data from a keyboard 124 and a mouse 126, as examples. The I/O controller 117 may also control operations of a floppy disk drive 122. Copies of the program 119 may be stored on, as examples, the hard disk drive 132, a diskette or a CD-ROM, as just a few examples.

In the context of this application, the phrase "computer system" may generally refer to a processor-based system and may include (but is not limited to) a graphics system, a desktop computer or a mobile computer (a laptop computer, for example), as just a few examples. The term "processor" may refer to, as examples, at least one microcontroller, X86 microprocessor, Advanced RISC Machine (ARM) microprocessor, or Pentium-based microprocessor. The examples given above are not intended to be limiting, but rather, other types of computer systems and other types of processors may be included in embodiments of the invention.

Unlike still image compression, video sequence codecs need to be computationally efficient. In case of real time interactive applications, a codec may need to process video frames at a rate of 30 frames/second or higher.

Figure 8:
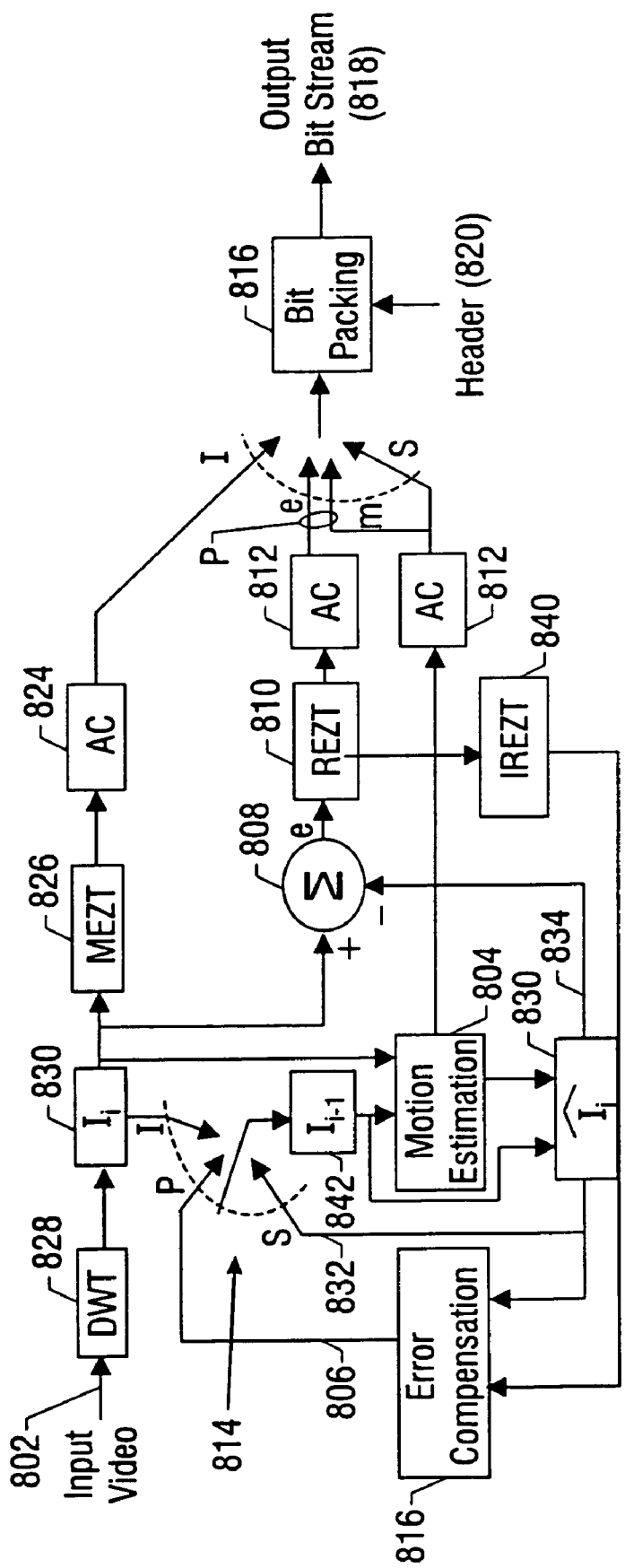
FIG. 8 is a block depiction of a codec in accordance with one embodiment of the present invention.

The codec 800 input 802, shown in FIG. 8, includes frames of the incoming video sequence. The frames are coded by the codec 800 as intra (I), predicted (P) or skipped (S) frames. The I frame, which is sent at regular intervals starting from the first frame, contains the result of arithmetic coding (AC) 824 on the modified embedded zerotree (MEZT) coded 826 discrete wavelet transformed (DWT) image 828, as described previously herein. One suitable arithmetic coding technique is described in I. H. Witten et al., "Arithmetic Coding for Data Compression", Communications of the ACM, Vol. 30, No. 6, June 1987.

An error image, error frame or error data is the difference between two frames of image data. For the first frame, which is an intra or I-frame, MEZT may be applied as indicated at 826. The next frame is the predicted or P-frame, that is not directly encoded. Instead, the difference from the first or I frame is determined at 808 and that difference is encoded at 812.

The reconstructed predicted frame is the result of encoding error frames using reverse embedded zerotree coded error frames REZT 812 followed by inverse REZT (IREZT) 840. REZT will be explained later. A reconstructed image 830 is then developed from the motion estimation 804 to develop the skipped or S frame 832 and the predicted or P frame 806. The reconstructed frame 830 goes to the inverting input of summer 808. The error compensation 816 is developed from the error frame from IREZT 840 and added to the S frame at 832 to get the P frame 806.

The programmable switch 814 is used to select an I frame, P frame or S frame based on quality feedback. If the error determined by the IREZT 840 is very small there is no need to use that data and so the data is simply skipped or dropped and only the motion vector 804 is transmitted which is received from the block 830. When the error is high, data is compensated or added at 813 and the P frame is used. The block 842 designates the selected frame as the previous frame for the motion estimation 804.

Regular transmission of I frames ensures robustness of the codec 800 against any channel error and removal of accumulated reconstruction error. However, since frequent transmission of I frames may reduce the compression ratio (CR), an optimization may be used to maintain a high CR as well as robustness of the codec 800. For the remaining frames, motion estimation 804 with respect to the previous reconstructed frames 806 is done using multi-resolution motion estimation (MRME) technique. One suitable MRME technique is described in Ya-Qin Zhang et al. "Motion-Compensated Wavelet Transform Coding for Color Video Compression", IEEE Trans. On Circuits and Systems for Video Technology, Vol. 2, No. 3, pp. 285–296, September 1992. In cases where the quality of motion estimation leads to small prediction errors, high compression is achieved by dropping the corresponding error frames and transmitting only the motion vectors (such frames are denoted by S or skipped frames) 832.

When the error accumulated by this process crosses a certain threshold as determined at 830, the codec 800 is partially refreshed by transmitting the stream generated by application of AC 812 on a REZT 812 error frame along with the motion vectors 832. Such frames, denoted by P, may be sent at an optimal frequency to maintain a high CR as well as a high peak signal to noise ratio (PSNR) of the reconstructed sequence.

Thus, switching between I, P and S frames is controlled by the energy of the error frame. The performance of the codec 800 may be primarily dependent on the efficiency of REZT 810 and hence also on the correctness and efficiency of MRME 804.

Usually, the codec 800 sends a motion vector m from 804 and optionally an error value e from 808. For the P frame both the motion vector m and the error value e are sent. For an S frame, only the motion vector m is sent.

The information generated by the processes described above is packed at 816, along with a header, to generate the output bit stream 818. The header 820 may contain information regarding the size of the frame, the length of the sequence along with the type of coding applied in each frame.

Figure 9:
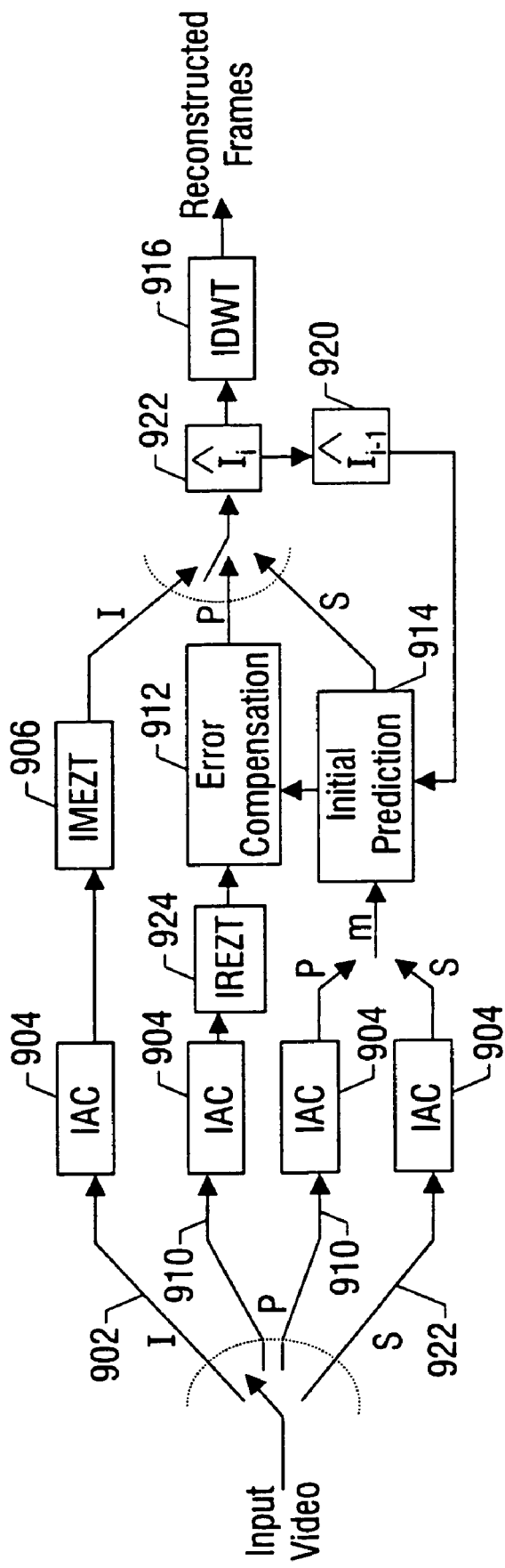
FIG. 9 is a block diagram of a sequence decoder in accordance with one embodiment of the present invention.

At the receiver end, shown in FIG. 9, a reverse procedure may be followed using a sequence decoder 900. The first frame, being an I frame 902, is easily reconstructed by performing entropy decoding 904 followed by MEZT decoding 906.

For the other frames, the ith frame is predicted from the previously reconstructed frames ((i−1)th) 920 and the transmitted motion vectors 922. In case of the P frame, the error frame 912 is added to the predicted frame 914 to complete the reconstruction process. The S frame is the motion vector without the error frame. Finally, inverse DWT (IDWT) 916 is applied to each of the frames to get the reconstructed sequence.

In one embodiment, the first block 828 of the codec 800 does the DWT operation, as shown in FIG. 8. DWT results in decomposition of each of the input frames into a multi-resolution subband structure. Unlike the discrete cosine transform (DCT), discrete wavelet transformed images contain a lower resolution version of the original image that is usually called the low-frequency subband. Parameters such as the filter coefficients, the number of decomposition levels, etc. can be chosen depending upon the image sequence and its intended application. Moreover, for two-dimensional DWT, filtering is actually applied separately along each dimension, which makes it parallelly realizable and hence suitable for real time applications.

In case of still image compression (i.e., the I frames where no prediction is applied), the matrix obtained after DWT is coded using MEZT scheme as indicated at block 826. This is an efficient bit-plane wise embedded zerotree coding scheme.

Since DWT is a multi-resolution transform, which generates a subband hierarchy, it is quite natural to use MRME to exploit this property. The resulting multi-resolution subband structure ensures a strong correlation between the motion activities of subbands at different positions and levels. Further, the blocking artifacts generated due to the simple transitory motion model are partially smoothened by the low pass filtering during inverse DWT.

Wavelet transform decomposes a video frame into a set of sub-frames with different resolutions corresponding to different frequency bands. These multi-resolution frames provide a representation of the global motion vectors of the video sequence at different scales.

Although the motion activities for each sub-frame are not all identical, at the same time they are highly correlated and hence can be used as an excellent first approximation. In the MRME approach, motion vectors for higher resolution are derived from those of the lower resolution motion vectors. A variable block size approach is taken, in one embodiment, which not only reduces the search space and hence the computational time but also provides a meaningful characterization of the intrinsic motion structure (following the structure of the wavelet transformed sub-frames).

In one embodiment, the motion estimation 804 may be carried out using a three step search algorithm. But in principle, any other motion estimation technique may be suitable for applying in multiresolution hierarchical DWT subbands. The subsampled image (low-frequency subband) is first broken into blocks. Then for each block of a current frame (the frame for which motion estimation is being carried out) a matching block from a previous frame is identified using a distance criterion. The distance criterion may be a minimum mean square error, minimum mean of pixel by pixel absolute differences, or maximum matching pixel count as a few examples. Sum of Pixels by Pixel Absolute Difference (SAD) may be used as the distance criterion for choosing the best match. The frame is reconstructed at the transmitter end from the previous frame and the motion vectors for purposes of comparison.

In a three step search, SAD is calculated, at the center and at eight specific points within search window in the first step. The distances of these positions are four pixels away from center of the block of interest. The positions are the eight neighbors of a pixel. Depending upon the values of SAD at each search position, the next step search is carried out. At the next step, the search positions are along the same directions but around the position where minimum SAD was found at the previous step and the distance is reduced to two pixels instead of four pixels. The minimum SAD position is found in this step. The last step search is carried out around this position and now the distance is only one pixel. Here the window size becomes seven pixels (4+2+1) along the x or y direction. So the search window is 15×15 pixels.

In the case of a full search algorithm, the number of search positions would have been 15×15=225. But now the total number of search positions has been reduced to only 3×8+1=25 resulting in a speed increase by a factor of nine times.

As the multi-resolution motion estimation approach may drastically reduce the computation time, more computationally involved (but better) search strategies may be used. In the extreme case, a full search may be used. Here, a search window is located around the current block and SAD is calculated for all positions within that search window. A full search may be performed as the search space is small and a better estimate of the block motions results in less prediction error, thus reducing the bit budget.

In one embodiment, the block LL may be transmitted as it is. However, motion estimation or compensation may also be implemented on this block, as it is the same image at a lower resolution. For the block HL motion prediction may be performed. The block size taken was 8*8 and the search area was restricted to a small value in this example. For the LH block the motion estimation may be done over a reduced search area by using the motion vectors calculated for the corresponding blocks in the HL subblock as an initial guess.

For the HH block no motion prediction may be done, since a visual system is less sensitive to changes along the diagonal direction.

For decoding, the block LL may be stored without any modification in one embodiment. For the blocks HL and LH the values are reconstructed using the associated motion vectors and the previous frame. For the block HH, the average of the motion vectors for the corresponding HL and LH positions may be used to reconstruct from the previous frame.

The REZT 810 may significantly improve the efficiency of the codec 800 because it may generate a very highly compressed bit-stream for the error frame in DWT domain. The block 810 may result in a significant reduction in computational complexity by drastically reducing the number of scans necessary for coding the error frame coefficients.

The arithmetic coding 812 performs the task of entropy coding of the symbol stream generated by the REZT 810 for the error frames. A variety of arithmetic coding schemes may be used for entropy encoding.

The DWT-based video codec 800 may be computationally efficient because of reduced computational requirements in the multi-resolution motion estimation and bit-plane wise embedded zerotree coding schemes both for DWT frames and the error frames after motion estimation and compensation. The encoding scheme may work in one as opposed to two passes. This makes the codec 800 suitable for implementation both in software and hardware.

Figure 10:
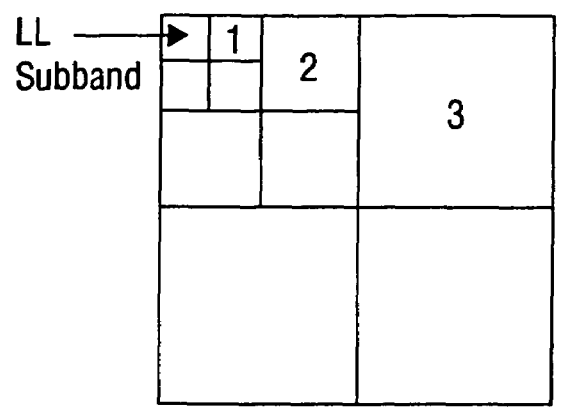
FIG. 10 depicts a scanning pattern in one embodiment of the present invention.

The REZT embedded coding scheme is suitable for error images or frames. The error image can be generated by taking difference of two successive DWT images in an image sequence. In the context of video, the error frame is the difference of the original frame from the reconstructed previous frame in the DWT domain. Motion prediction followed by motion compensation leads to generation of reconstructed frames. In error frames, the efficiency is increased by applying the embedded coding in HL, LH, and HH subbands only as shown in FIG. 10. The LL subband can be transmitted without any change. The embedded coding may be performed in every bit-plane in one embodiment.

Before describing the encoding and decoding algorithm, a set of symbols (all the definitions are with respect to a certain threshold T0 and for the nth pass of encoding or decoding) is defined as follows:

POS: If the nth bit of a coefficient is 1 and the coefficient is positive, then the nth bit is coded as POS.

NEG: If the nth bit of a coefficient is 1 and the coefficient is negative, then the nth bit is coded as NEG.

ABS_ROOT: If the coefficient as well as all its children have magnitude less than all the thresholds greater than or equal to T0, then the nth bit is coded as ABS_ROOT.

ROOT: If the nth bit of a coefficient as well as that of all its children are 0; and if the magnitude of the coefficient is not less than all the thresholds greater than $T_0$, then the nth bit is coded as ROOT.

ROOT_IZ: If the nth bit of a coefficient as well as that of all its children are 0; and if the magnitude of the coefficient is less than all the thresholds greater than $T_0$, but the magnitude of all its children are not less than all the thresholds greater than $T_0$, then the nth bit is coded as ROOT_IZ.

ABS_IZ: If the nth bit of a coefficient is 0 but that of all its children are not 0; and if the magnitude of the coefficient is less than all the thresholds greater than $T_0$, then the nth bit is coded as ABS_IZ.

IZ: If the nth bit of a coefficient is 0 and that of all its children are not 0; and if the magnitude of the coefficient is not less than all the thresholds greater than $T_0$, then the nth bit is coded as IZ.

Figure 11:
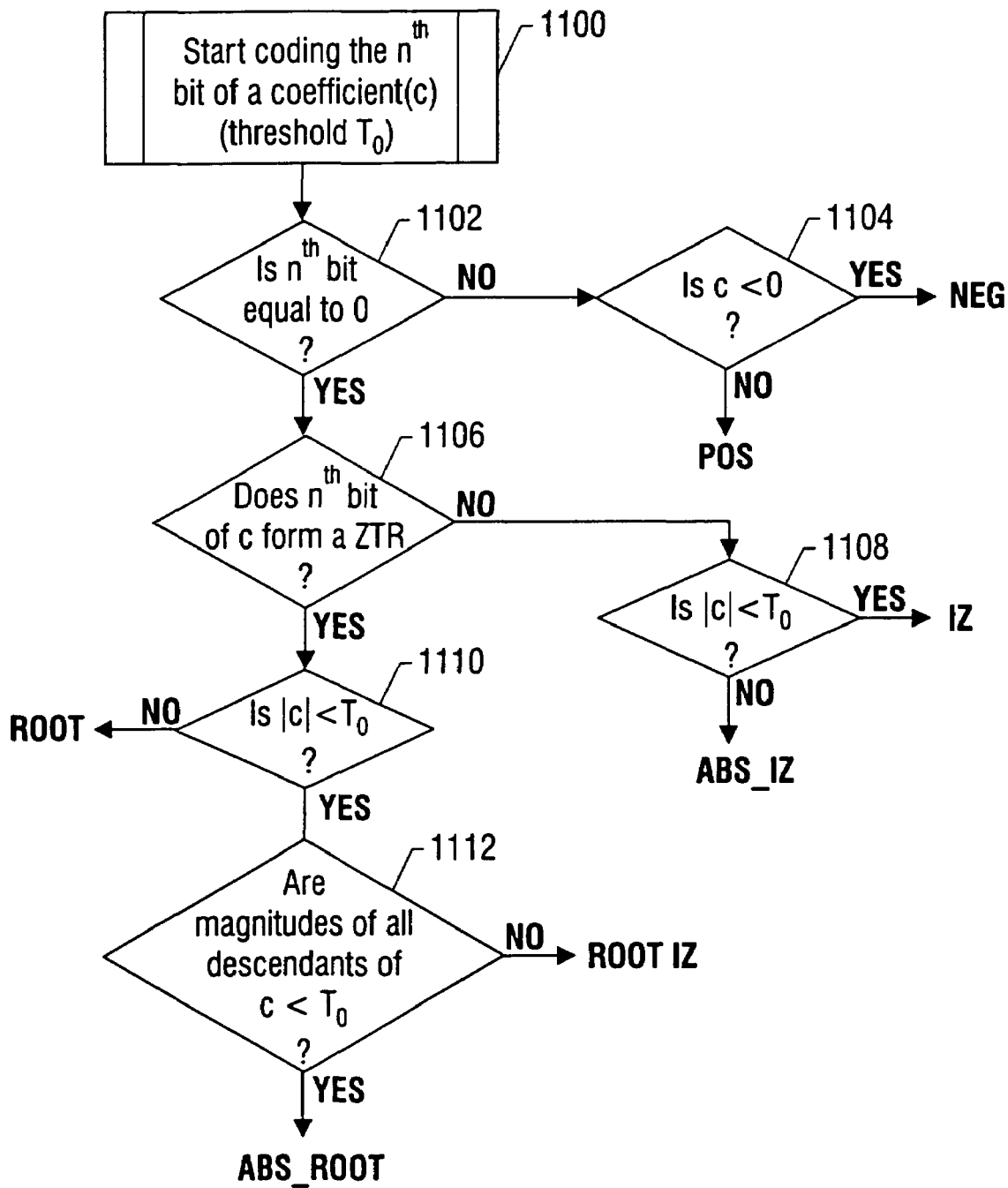
FIG. 11 is a flow chart in accordance with one embodiment of the present invention.

The encoding algorithm 1100 for the nth bit of a coefficient (c) in the error frame with respect to a threshold $T_0$, shown in FIG. 11, begins by determining whether the $n^{th}$ bit is equal to zero, at diamond 1102. If not, a check at diamond 1104 determines whether the coefficient is less than zero. If so, the bit is labeled negative and if not, the bit is labeled positive.

If the $n^{th}$ bit is equal is zero as determined at diamond 1102, a check at diamond 1106 determines whether $n^{th}$ bit of the coefficient forms a zerotree. If not, a check at diamond 1108 determines whether or not the absolute value of the coefficient is greater than the threshold $T_0$. If so, the bit is labeled an isolated zero and if not it is labeled an absolute isolated zero.

If the $n^{th}$ bit of the coefficient forms a zerotree as determined at diamond 1106, a check at diamond 1110 determines whether the absolute value of the coefficient is less than $T_0$. If not, the bit is labeled a root. If so, a check at diamond 1112 determines whether the magnitudes of all the descendants of the coefficient are less than $T_0$. If so, the bit is labeled an absolute root and if not it is labeled a root isolated zero.

Figure 12:
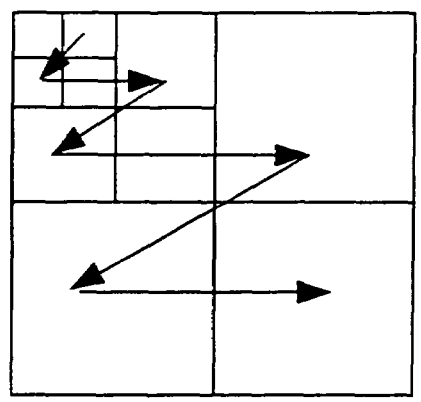
FIG. 12 is a diagram showing the scanning pattern for embedded coding in accordance with one embodiment of the present invention.

The error matrices (or frames) are discrete wavelet transformed (DWT) and the resultant subbands are of the form as shown in FIG. 12. The labels (1,2,3) indicate the level number of the subbands.

The starting threshold is taken as 1 in one example. In each successive pass the threshold is doubled. The total number of such pass is $\lfloor \log_2(max) \rfloor + 1$, where max denotes the maximum value among the magnitudes of all the coefficients to be encoded. The scanning pattern for the coefficients is shown in FIG. 12.

Figure 13:
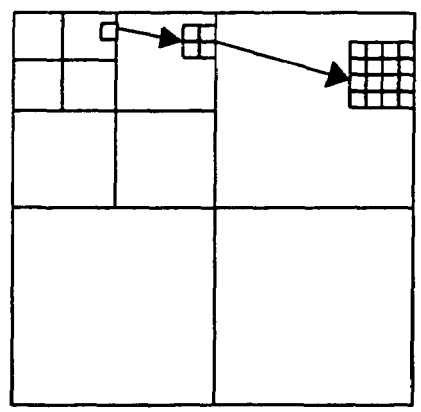
FIG. 13 is a diagram showing the parent/child relationship between blocks in accordance with one embodiment of the present invention.

The parent-child relation for the DWT coded frames is shown in FIG. 13. The four pixels at level 2 are the children of the pixel marked in level 1. The sixteen pixels at level 3 are also the descendants of marked pixel in the 1st level.

In each pass, whenever a coefficient is coded as ABS_ROOT, ABS_IZ or ROOT_IZ, the corresponding positions are suitably marked against further scanning. However, for ABS_IZ or ROOT_IZ, the marks are valid only for the ongoing pass.

The following hypothetical example is given to aid in understanding of the coding scheme:

| Subband #1 | | Subband #2 | |
|---|---|---|---|
| | 001 001<br>000 010 | 100 001<br>001 000 | 000 000<br>100 011 |
| | | 000 010<br>000 000 | 000 001<br>001 000 |
| | | | |
| | | | |

In this example, only a part of the error matrix is shown. Encoding of the rest of the matrix follows the same algorithm and hence its coding/decoding has not been shown in details. The numbers shown are in the binary representation. For convenience of representation, the seven symbols explained before are coded using the following abbreviations:

| POS: P | NEG: N | ROOT: R | ABS_ROOT: r |
|---|---|---|---|
| ROOT_IZ: ~ | IZ: I | ABS_IZ: i | |

For encoding of this matrix, the number of passes required is given by $\log_2(\max)+1$. In the above example max=4 (100) and so the total number of passes=3, i.e. pass_index varies from 1 to 3.

For pass_index=1, $T_0$ (threshold)=1.

The symbols generated for subband #1 for the least significant bits are P, P, ~, I. The first and second coefficients (row-wise) are "1" so they are positive and are labeled "P". The first coefficient in the next row is root isolated zero as indicated by the fact that all of the children (in the lower left quadrant of subband #2) are zero. Then none of the children need to be encoded and they are so marked (as indicated below by the underline). This analysis may be done as part of a single pass.

The marked-matrix after this stage with underlining being used to indicate bits that are not to be traversed/coded for the ongoing pass and an overline being used to indicate bits that are not to be traversed/coded for the remaining part of the encoding:

| 00$\overline{1}$ | 00$\overline{1}$ | 100 | 001 | 000 | 000 |
|---|---|---|---|---|---|
| $\overline{000}$ | 01$\overline{0}$ | 001 | 000 | 100 | 011 |
| | | 00$\underline{0}$ | 01$\underline{0}$ | 000 | 001 |
| | | 00$\underline{0}$ | 00$\underline{0}$ | 001 | 000 |

The symbols generated for subband #2 are R, P, r, r, P, r, R, P, r, P, P, r. The underlined least significant bits above were marked and therefore those bits are not coded.

The marked-matrix after this stage is as follows:

| 00$\overline{1}$ | 00$\overline{1}$ | 10$\overline{0}$ | 00$\overline{1}$ | $\overline{000}$ | $\overline{000}$ |
|---|---|---|---|---|---|
| $\overline{000}$ | 01$\overline{0}$ | 00$\overline{1}$ | $\overline{000}$ | 100 | 01$\overline{1}$ |
| | | 00$\underline{0}$ | 01$\underline{0}$ | $\overline{000}$ | 00$\overline{1}$ |
| | | 00$\underline{0}$ | 00$\underline{0}$ | 00$\overline{1}$ | $\overline{000}$ |

After an end of pass adjustment, the marked-matrix becomes:

| 00$\overline{1}$ | 00$\overline{1}$ | 10$\overline{0}$ | 00$\overline{1}$ | $\overline{000}$ | $\overline{000}$ |
|---|---|---|---|---|---|
| $\overline{000}$ | 01$\overline{0}$ | 00$\overline{1}$ | $\overline{000}$ | 100 | 01$\overline{1}$ |
| | | 00$\overline{0}$ | 01$\overline{0}$ | $\overline{000}$ | 00$\overline{1}$ |
| | | 00$\overline{0}$ | 00$\overline{0}$ | 00$\overline{1}$ | $\overline{000}$ |

For pass_index=2, $T_0$(threshold)=1*2=2;

The symbols generated for subband #1 are ~, i, P. The marked-matrix after this stage is then:

| 00$\overline{1}$ | 00$\overline{1}$ | 1$\underline{0}$0 | 00$\overline{1}$ | $\overline{000}$ | $\overline{000}$ |
|---|---|---|---|---|---|
| $\overline{000}$ | 01$\overline{0}$ | 0$\underline{0}$$\overline{1}$ | $\overline{000}$ | 100 | 01$\overline{1}$ |
| | | 00$\overline{0}$ | 01$\overline{0}$ | $\overline{000}$ | 00$\overline{1}$ |
| | | 00$\overline{0}$ | 00$\overline{0}$ | 00$\overline{1}$ | $\overline{000}$ |

The symbols generated for subband #2 are R, P, r, P, r, r, r, r. The marked-matrix after this stage is:

| 00$\overline{1}$ | 00$\overline{1}$ | 10$\overline{0}$ | 00$\overline{1}$ | $\overline{000}$ | $\overline{000}$ |
|---|---|---|---|---|---|
| $\overline{000}$ | 01$\overline{0}$ | 00$\overline{1}$ | $\overline{000}$ | 100 | 01$\overline{1}$ |
| | | $\overline{000}$ | 01$\overline{0}$ | $\overline{000}$ | 00$\overline{1}$ |
| | | $\overline{000}$ | $\overline{000}$ | 00$\overline{1}$ | $\overline{000}$ |

After end of pass adjustment, marked-matrix becomes:

| 00$\overline{1}$ | 00$\overline{1}$ | 10$\overline{0}$ | 00$\overline{1}$ | $\overline{000}$ | $\overline{000}$ |
|---|---|---|---|---|---|
| $\overline{000}$ | 01$\overline{0}$ | 00$\overline{1}$ | $\overline{000}$ | $\overline{100}$ | 01$\overline{1}$ |
| | | $\overline{000}$ | 01$\overline{0}$ | $\overline{000}$ | 00$\overline{1}$ |
| | | $\overline{000}$ | $\overline{000}$ | 00$\overline{1}$ | $\overline{000}$ |

For pass_index=3, $T_0$(threshold)=2*2=4. The symbol generated for subband #1 is r. The marked-matrix after this stage is:

| 00$\overline{1}$ | 00$\overline{1}$ | 1$\overline{00}$ | 0$\overline{01}$ | $\overline{000}$ | $\overline{000}$ |
|---|---|---|---|---|---|
| $\overline{000}$ | 01$\overline{0}$ | 00$\overline{1}$ | $\overline{000}$ | $\overline{100}$ | 01$\overline{1}$ |
| | | $\overline{000}$ | 01$\overline{0}$ | $\overline{000}$ | 00$\overline{1}$ |
| | | $\overline{000}$ | $\overline{000}$ | 00$\overline{1}$ | $\overline{000}$ |

The symbols generated for subband #2: P, r, r, P, r, r. The marked-matrix after this stage becomes:

| 00$\overline{1}$ | 00$\overline{1}$ | $\overline{100}$ | 0$\overline{11}$ | $\overline{000}$ | $\overline{000}$ |
|---|---|---|---|---|---|
| $\overline{000}$ | 01$\overline{0}$ | 00$\overline{1}$ | $\overline{000}$ | $\overline{100}$ | 01$\overline{1}$ |
| | | $\overline{000}$ | 01$\overline{0}$ | $\overline{000}$ | 00$\overline{1}$ |
| | | $\overline{000}$ | $\overline{000}$ | 00$\overline{1}$ | $\overline{000}$ |

At the end of the last third pass, there is no need for end of pass adjustment as there are no further passes. Hence the coding is complete and the generated symbols are P, P, ~, I, R, P, r, r, P, r, R, P, r, P, P, r, ~, I, P, R, P, r, P, r, r, r, r, r, r, P, r, r, P, r, r.

This stream of symbols can subsequently be encoded using an entropy encoding scheme such as Huffman Coding, Arithmetic Coding (AC), etc. This stream of symbols may be preceded by a header block, which indicates the maximum number of passes (3 in this case) along with the dimension of the coded matrix.

From the header the following information may be available: maximum number of passes, dimension of the matrix. For the nth pass, the nth bits of the coefficients are being decoded.

For pass_index=1, after subband#1 decoding of the codes P, P, ~, I, the decoded matrix looks like:

| $\overline{\phantom{0}}$1 | $\overline{1}$ | | |
|---|---|---|---|
| $\overline{000}$ | $\overline{0}$ | | |
| | | $\overline{0}$ | $\overline{0}$ |
| | | $\overline{0}$ | $\overline{0}$ |

The first and second coefficients (1 and 1) are derived from the first and second codes P. The code ~ indicates that all the bits are zeros and the bits of the children are zero. Thus, the values are completed as indicated above in subband#1 and subband#2. After subband#2 decoding of the codes R, P, r, r, P, r, r, r, r, the decoded matrix looks like:

| | | | | | |
|---|---|---|---|---|---|
| $\overline{1}$ | $\overline{1}$ | 0 | 1 | 000 | 000 |
| $\overline{000}$ | $\overline{0}$ | 1 | 000 | 0 | 1 |
| | | $\overline{0}$ | $\overline{0}$ | 000 | 1 |
| | | $\overline{0}$ | $\overline{0}$ | 1 | 000 |

In subband#2, the first coefficient is zero based on the code R, the second coefficient is one based on the code P, the next two coefficients are all zeros based on the two codes r.

For pass_index=2, after subband#1 decoding, the decoded matrix looks like:

| | | | | | |
|---|---|---|---|---|---|
| $\overline{001}$ | $\overline{01}$ | 00 | 01 | 000 | 000 |
| $\overline{000}$ | $\overline{10}$ | 01 | 000 | 0 | 1 |
| | | $\overline{0}$ | $\overline{0}$ | 000 | 1 |
| | | $\overline{0}$ | $\overline{0}$ | 1 | 000 |

After subband#2 decoding, the decoded matrix looks like:

| | | | | | |
|---|---|---|---|---|---|
| $\overline{001}$ | $\overline{001}$ | 00 | 01 | 000 | 000 |
| $\overline{000}$ | $\overline{10}$ | 01 | 000 | 00 | 11 |
| | | $\overline{000}$ | $\overline{10}$ | 000 | 001 |
| | | $\overline{000}$ | $\overline{000}$ | 001 | 000 |

For pass_index=3, after subband#1 decoding, the decoded matrix looks like:

| | | | | | |
|---|---|---|---|---|---|
| $\overline{001}$ | $\overline{001}$ | 00 | 01 | 000 | 000 |
| $\overline{000}$ | $\overline{010}$ | 01 | 000 | 00 | 11 |
| | | $\overline{000}$ | $\overline{10}$ | 000 | 001 |
| | | $\overline{000}$ | $\overline{000}$ | 001 | 000 |

After subband#2 decoding, the decoded matrix is as follows:

| | | | | | |
|---|---|---|---|---|---|
| $\overline{001}$ | $\overline{001}$ | 100 | 001 | 000 | 000 |
| $\overline{000}$ | $\overline{010}$ | 001 | 000 | 100 | 011 |
| | | $\overline{000}$ | $\overline{010}$ | 000 | 001 |
| | | $\overline{000}$ | $\overline{000}$ | 001 | 000 |

This scheme may perform satisfactorily in case of error frames both for still imaging and video coding. In cases when the compression ratio is of more importance compared to PSNR, then pass_numbers (1,2, . . . ) can be progressively dropped resulting in a significant increase in compression ratio (but incurring a loss in PSNR). If pass-levels are dropped progressively then the CR-performance of REZT improves at a better rate compared to that of MEZT.

The scheme may be computationally faster than the classical EZT technique. This scheme successfully avoids passing over the smaller or insignificant coefficients in every pass by encoding them in course of the initial passes. Further, the two passes of the classical scheme has been clubbed into a single pass.

Further compression can be achieved when the initial passes(1,2,. . . ) are dropped progressively. The decoding scheme remains same as stated earlier with a minor modification: suitable number of zeros (depending on the number of passes dropped) are to be appended to the decoded data. However, such a process results in PSNR loss.

Other embodiments are within the scope of the following claims. For example, the matrices of decomposed coefficients described above have one coefficient in each subband of the highest decomposition level. However, this arrangement is for purposes of simplifying the discussion of the coding. Therefore, each subband of the highest decomposition level may have multiple coefficients, and the above-described techniques may be applied to code the bits associated with these coefficients. In some embodiments, the processor 112 may code all of the bits of each order in parallel. In this manner, the coding of the bits of each bit order may be performed by the processor's execution of a separate thread. Other arrangements are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    providing error data that indicate motion in an image;
    representing error data as a collection of ordered bits;
    coding the bits by determining whether a given bit is equal to zero and if not, coding the bit based on whether its coefficient is positive or negative;
    if the bit is equal to zero, determining whether the bit is zerotree root and if not, coding the bit based on whether the absolute value of its coefficient is less than or equal to a threshold value; and
    if the bit has a coefficient of the form of a zerotree root, determining whether the coefficient is less than the threshold value or if not, coding the bit one way and if so, coding the bit depending on whether or not the magnitude of all the descendents of the coefficient are less than the threshold value.

2. The method of claim 1, wherein the act of coding the bits comprises:
    determining which of the bits indicate zeros; and
    classifying each zero as either an isolated zero or a zerotree root.

3. The method of claim 2, wherein some of the error data are descendants of some of the other error data, and wherein the act of determining comprises:
    traversing a descendant tree from a bit associated with one of said some of the error data to bits associated with said other error data to locate the zerotree roots.

4. The method of claim 1 wherein providing error data includes taking the difference between two successive image representations in an image sequence.

5. The method of claim 4 wherein taking the difference includes taking the difference of two successive discrete wavelet transform coded frames.

6. The method of claim 1 including coding said bits based on whether or not the data exceeds a predetermined threshold value.

7. An article comprising a storage medium readable by a processor-based system, the storage medium storing instructions to enable a processor to:
    provide error data that indicate motion in an image;
    represent error data as a collection of ordered bits;
    code the bits by determining whether a given bit is equal to zero and if not, code the bit based on whether its coefficient is positive or negative;

if the bit is equal to zero, determine whether the bit is zerotree root and if not, code the bit based on whether the absolute value of its coefficient is less than or equal to a threshold value; and if the bit has a coefficient of the form of a zerotree root, determine whether the coefficient is less than the threshold value or if not, code the bit one way and if so, coding the bit depending on whether or not the magnitude of all the descendents of the coefficient are less than the threshold value.

8. The article of claim 7, the storage medium comprising instructions to enable the processor to:

determine which of the bits indicate zeros; and classify each zero as either an isolated zero or a zerotree root.

9. The article of claim 8 wherein some of the error signals are descendants of some of the other error signals, the storage medium comprising instructions to enable the processor to:

traverse a descendant tree from a bit associated with one of said some of the error data to bits associated with said other error data to locate the zerotree roots.

10. The article of claim 7 wherein the storage medium comprising instructions to enable the processor to provide error data by taking the difference between the successive image representations in an image sequence.

11. The article of claim 10, the storage medium comprising instructions to enable the processor to take the difference of two successive discrete wavelet transform coded frames.

12. The article of claim 7, the storage medium comprising instructions to enable the processor to code the bits based on whether or not the data exceeds a predetermined threshold.

13. A system comprising:

a device to generate error frames by differencing two successive frames and to represent the error frames as a collection of ordered bits; and an element to code the bits by determining whether a given bit is equal to zero and if not, coding the bit based on whether its coefficient is positive or negative, if the bit is equal to zero, determining whether the bit is zerotree root and if not, coding the bit based on whether the absolute value of its coefficient is less than or equal to a threshold value, and if the bit has a coefficient of the form of a zerotree root, determining whether the coefficient is less than the threshold value or if not, coding the bit one way and if so, coding the bit depending on whether or not the magnitude of all the descendents of the coefficient are less than the threshold value.

14. The system of claim 13 wherein said device includes a processor and a storage medium storing instructions to enable the processor to provide error data that indicate motion in the image, represent the error data as a collection of ordered bits, and encode the bits of each order to indicate zerotree roots that are associated with the order.

15. The system of claim 13 wherein said device codes said bits based on whether or not the data exceeds a predetermined threshold value.

* * * * *